Patented Oct. 24, 1922.

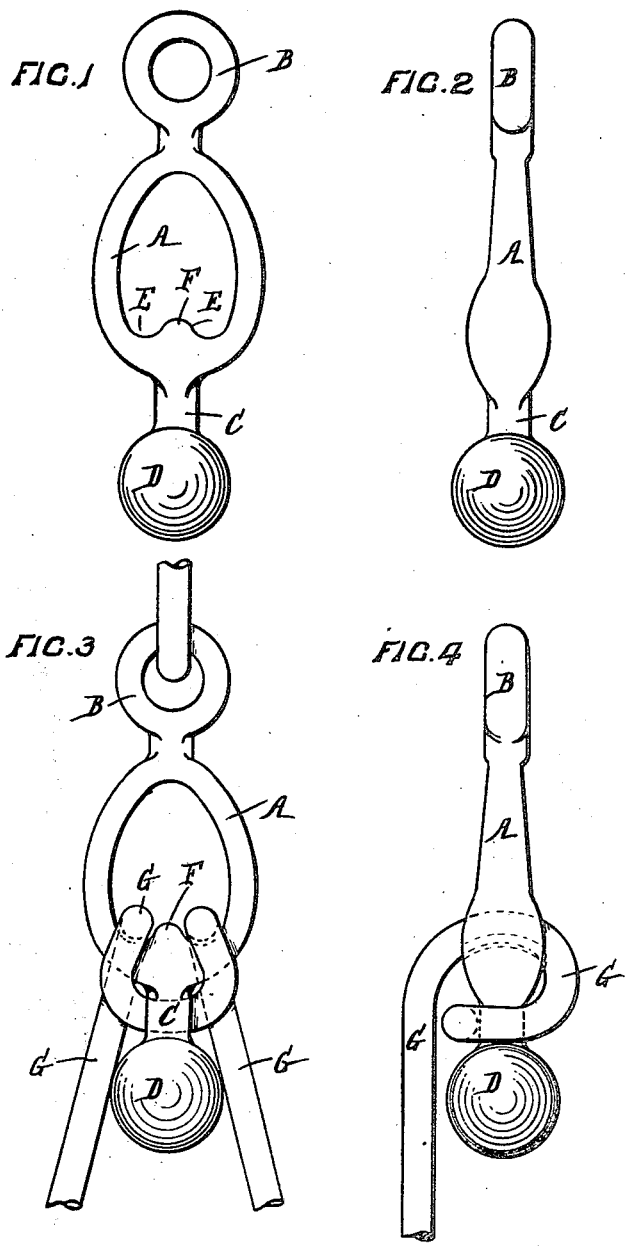

1,433,024

UNITED STATES PATENT OFFICE.

RODGER MORRISON, OF PONSONBY, AUCKLAND, NEW ZEALAND.

DEVICE FOR USE IN THE ATTACHMENT OF SLINGS TO THE HOISTING MEANS.

Application filed November 17, 1919. Serial No. 338,671.

*To all whom it may concern:*

Be it known that I, RODGER MORRISON, subject of the King of Great Britain, residing at 64 Islington Avenue, Ponsonby, Auckland, New Zealand, have invented a new and useful Improved Device for Use in the Attachment of Slings to the Hoisting Means; and I do hereby declare the following to be a full, clear, and exact description of the same.

This invention has been devised in order to provide a substitute for the ordinary type of sling hook used in the hoisting of goods in ships' slings and for other analogous purposes. The device now designed for such purposes does away with the objection to the use of the ordinary hooks by reason of their liability to catch on any impediment with which they may engage while swinging, and at the same time provides for the sling, whether of rope or chain, being effectively held upon the hoisting or suspension means.

The device consists in an elongated link, at one of its ends having an eye or other means for its attachment to the suspension wire or cable, and at its other formed with a tongue extending longitudinally with the link's length, from the centre line thereof downwards for an approved distance. This tongue at its bottom end is formed with a large round knob. If necessary, the lower end of the link may be thickened around the neck of the tongue.

In the accompanying drawings:—

Figure 1 is a front elevation of the device.

Figure 2 is a side elevation thereof.

Figures 3 and 4 are respectively similar views with a sling in engaging position thereon.

A is the link having at its upper end an eye shank B for its attachment to the hoisting cable. C is the tongue extending from the lower end of the link in a line continuous with the centre line thereof, and D is the knob with which such tongue ends.

In use, a sling G is attached to the device by passing the bight or loop thereof through the link, carrying it round and under the lower end and looping it over the knob D so that it surrounds the tongue C. Then when the weight is placed on the sling, the loop around the tongue is drawn tight and the weight carried by the link. It is impossible for the sling to slip off the tongue so long as the weight remains upon it, as the knob is made sufficiently large to hold it and most of the strain on the loop is in an upward direction around the tongue. When the strain is relieved, the sling may be easily and quickly detached.

The lower end of the link A is preferably made wider than the upper end, as shown in Figures 1 and 3 and its inner edge formed with the two concavities E upon opposite sides of a central projection F in which the respective members of the sling bight or loop will fit. This will serve to prevent any jamming of the sling in the link and also any tendency for one member of the bight to ride on the other.

I claim:—

A link for attachment to a cable and provided at the end opposite the cable with an inwardly extended projection and also with an outwardly projecting tongue having a head at its outer end and spaced from the link.

In testimony whereof, I have signed this specification in the presence of two subscribing witnesses.

RODGER MORRISON.

Witnesses:
DAVID BROWN HUTTON,
HAROLD MASON WARNER.